United States Patent
Voigt et al.

(10) Patent No.: US 9,746,046 B2
(45) Date of Patent: Aug. 29, 2017

(54) LEAF SPRING MADE OF A FIBER COMPOSITE MATERIAL HAVING INTEGRATED BEARING EYES AND METHOD OF PRODUCING SAID LEAF SPRING

(71) Applicant: IFC Composite GmbH, Haldensleben (DE)

(72) Inventors: Matthias Voigt, Hohe Boerde OT Brumby (DE); Maik Schreier, Madgeburg (DE); Heiko Kempe, Madgeburg (DE); Dirk Neyer, Wieglitz (DE)

(73) Assignee: IFC Composite GmbH, Haldensleben (DE)

( * ) Notice: Subject to any disclaimer, the term of this patent is extended or adjusted under 35 U.S.C. 154(b) by 161 days.

(21) Appl. No.: 14/723,651

(22) Filed: May 28, 2015

(65) Prior Publication Data

US 2015/0316114 A1 Nov. 5, 2015

Related U.S. Application Data

(60) Division of application No. 13/590,343, filed on Aug. 21, 2012, now Pat. No. 9,194,451, which is a
(Continued)

(30) Foreign Application Priority Data

Feb. 26, 2010 (DE) .................. 10 2010 009 528

(51) Int. Cl.
*B60G 11/02* (2006.01)
*F16F 1/368* (2006.01)

(52) U.S. Cl.
CPC ...... *F16F 1/368* (2013.01); *F16F 2224/0241* (2013.01); *F16F 2238/022* (2013.01); *Y10T 156/1044* (2015.01)

(58) Field of Classification Search
CPC .... F16F 1/368; B29C 2791/002; B29C 70/20; B29C 70/46
(Continued)

(56) References Cited

U.S. PATENT DOCUMENTS 3,900,357 A * 8/1975 Huchette ............... B29C 70/345
156/185
3,968,958 A 7/1976 Huchette et al.
(Continued)

FOREIGN PATENT DOCUMENTS

DE 1231967 1/1967
DE 35 28 183 A1 3/1986
(Continued)

OTHER PUBLICATIONS

PCT/DE2013/000376 International Search Report dated Nov. 13, 2013.

*Primary Examiner* — Christopher Schwartz
(74) *Attorney, Agent, or Firm* — Woodard Emhardt Moriarty McNett & Henry LLP

(57) ABSTRACT

A leaf spring made of a fiber composite material having integrated bearing holes and a method for producing is disclosed. The method comprises the steps of cutting prepreg strips of a predetermined length from a prepreg strand, removing cut-outs from the particular prepreg strip in the axial ends where a bearing hole should be formed, laying a plurality of prepreg strips one over the other in a prepreg stack in alternation so that the surfaces of the prepreg strips are flush to form a raw leaf spring forming a bearing hole by deforming an axial end of the prepreg stack in a plane perpendicular to the longitudinal extension (L) and perpendicular to the transverse extension (B) of the prepreg stack,
(Continued)

setting the raw sheet spring to form the finished leaf spring in a mold with a suitable setting pressure and a suitable setting temperature.

15 Claims, 4 Drawing Sheets

Related U.S. Application Data continuation of application No. PCT/DE2011/000157, filed on Feb. 17, 2011.

(58) Field of Classification Search
USPC ..... 267/37.2, 44, 47, 52, 148; 156/169, 185, 156/191, 192, 245; 264/258
See application file for complete search history.

(56) References Cited

U.S. PATENT DOCUMENTS

| | | | |
|---|---|---|---|
| 4,196,950 A | 4/1980 | Churchill et al. | |
| 4,201,826 A | 5/1980 | Nylander | |
| 4,468,014 A * | 8/1984 | Strong | F16F 1/368 |
| | | | 188/268 |
| 4,512,559 A * | 4/1985 | Aoyama | B60G 11/113 |
| | | | 267/158 |
| 4,556,204 A * | 12/1985 | Pflederer | F16F 1/3686 |
| | | | 267/148 |
| 4,596,835 A | 6/1986 | Werner et al. | |
| 4,659,071 A * | 4/1987 | Woltron | B60G 11/12 |
| | | | 156/169 |
| 4,683,018 A | 7/1987 | Sutcliffe et al. | |
| 4,786,033 A * | 11/1988 | Kofler | F16F 1/368 |
| | | | 156/141 |
| 4,894,108 A * | 1/1990 | Richard | B29C 70/24 |
| | | | 156/245 |
| 6,390,486 B1 * | 5/2002 | Boes | B60G 3/10 |
| | | | 267/192 |
| 6,422,540 B1 * | 7/2002 | Pfletschinger | F16F 1/368 |
| | | | 156/185 |
| 6,461,455 B1 * | 10/2002 | Meatto | B29C 35/0272 |
| | | | 156/273.7 |
| 6,530,562 B1 * | 3/2003 | Sutton | F16F 1/185 |
| | | | 267/36.1 |
| 6,619,637 B1 * | 9/2003 | Juriga | B60G 11/12 |
| | | | 267/262 |
| 7,712,754 B2 * | 5/2010 | Penzotti | B60G 11/12 |
| | | | 267/260 |
| 8,852,709 B2 * | 10/2014 | Lozano Garcia | B29C 70/30 |
| | | | 428/156 |
| 9,194,451 B2 * | 11/2015 | Voigt | F16F 1/368 |
| 2009/0256296 A1 | 10/2009 | Aulich et al. | |
| 2012/0034833 A1 | 2/2012 | Schaube et al. | |
| 2012/0313307 A1 | 12/2012 | Cartwright et al. | |
| 2012/0328858 A1 | 12/2012 | Fujiwara et al. | |

FOREIGN PATENT DOCUMENTS

| | | | |
|---|---|---|---|
| DE | 4026045 A1 | 2/1992 | |
| DE | 4026046 A1 | 2/1992 | |
| DE | 19617699 A1 | 11/1997 | |
| DE | 102005034499 A1 | 2/2007 | |
| DE | 10 2006 052 137 A1 | 5/2008 | |
| DE | 102010050065 A1 | 5/2012 | |
| EP | 0 084 101 A2 | 7/1983 | |
| EP | 0 106 249 A1 | 4/1984 | |
| EP | 0215365 | 3/1987 | |
| EP | 0956981 | 11/1999 | |
| EP | 2 363 271 A1 | 9/2011 | |
| GB | 106571 | 6/1917 | |
| GB | 2125929 | 3/1984 | |
| JP | 56141435 | 11/1981 | |
| JP | 57 107 817 A1 | 7/1982 | |
| JP | 57124141 | 8/1982 | |
| JP | 57179442 A | 11/1982 | |
| JP | 58077941 | 5/1983 | |
| JP | 58077942 | 5/1983 | |
| JP | 59006443 | 1/1984 | |
| JP | 1278634 | 12/1986 | |
| WO | WO2008055458 | * 5/2008 | B29C 70/46 |

\* cited by examiner

LEAF SPRING MADE OF A FIBER COMPOSITE MATERIAL HAVING INTEGRATED BEARING EYES AND METHOD OF PRODUCING SAID LEAF SPRING

CROSS-REFERENCE TO RELATED APPLICATION

This application is a divisional of U.S. patent application Ser. No. 13/590,343 filed Aug. 21, 2012, which is a continuation of International Application No. PCT/DE2011/000157, filed Feb. 17, 2011, which claims the benefit of German Application No. 10 2010 009 528.1, filed Feb. 26, 2010, the entire disclosures of which are hereby incorporated by reference.

BACKGROUND

The invention relates to a leaf spring made of a fiber composite material having integrated bearing eyes according to the disclosure and to a method for producing the same.

Leaf springs having end-situated bearing eyes are known per se and are used, for instance, in vehicles, where they serve to cushion the body of the vehicle from the chassis. Conventionally, leaf springs consist of several layers of narrow metal plates, which are stacked one upon the other and are held together by means of holding elements. Leaf springs made of composite materials have also however been proposed.

An earlier leaf spring construction consists of a plurality of composite components which are arranged one above the other and are connected to one another by retaining clips to form the leaf spring. Each of these composite material layers consists of an upper and a lower metallic sheet metal strip, between which a rigid plastics core is disposed. On at least one axial end, this leaf spring has a bearing eye integrated thereon, which bearing eye is formed by bending over and axially leading back the sheet metal strips of the topmost composite material layer to the axial middle of the leaf spring. This is realized such that the upper sheet metal strip of the composite material layer is guided around a circular sleeve in the direction of the lower sheet metal strip, while the lower sheet metal strip of this composite material layer, with the rigid plastics material inserted therebetween, is likewise guided around the sleeve, yet is deposited on the top side of the upper sheet metal strip. It is regarded as a drawback with this leaf spring that its structure consists of two different materials, and that the comparatively complicated wrapping of the bearing eye sleeve is laborious and therefore increases the production costs. Moreover, it is not possible to ensure that the rigid plastics core, disposed between the metal strips, of each individual composite material layer will withstand the prolonged alternating loads to which a leaf spring in a vehicle is operationally exposed.

Against this background, an object of the invention is to provide a leaf spring for a vehicle which can be cost-effectively produced and has high resistance to prolonged alternating load. This leaf spring should be produced from a non-metallic material and have on at least one of its axial ends a bearing eye integrated into the leaf spring. Moreover, a production method by which such a leaf spring can be cost-effectively produced shall be described.

The achievement of this object is derived, for the production method, from the features disclosed and claimed herein. Described herein is a leaf spring which achieves the device-related object. The disclosure and claims describe preferred embodiments of the invention.

The invention is based on the insight that the object can be achieved if the leaf spring is produced fully from a fiber composite material, namely from a fiber composite material, for instance consisting of prepreg strips laid one on top of the other in layers. Prior to the setting of the prepreg strips, the axial ends of the stack of the prepreg strips are bent in the shape of a circle, to form the at least one bearing eye, in the direction of the middle of the crude leaf spring and are connected to the fiber composite material which is farther away from the axial end. Next the crude leaf spring is hardened in a suitable mold, with the application of a setting temperature and setting pressure.

With the term "prepreg" is used to denote an intermediate product which consists of at least one layer of synthetic fibers impregnated with a synthetic resin. The synthetic fibers can be present in the prepreg as a woven fabric or as unidirectionally oriented fiber strands. The prepreg strips are cut to a predefined circumferential geometry. In the construction of the workpiece to be made up of this material, the synthetic resin is not yet hardened.

SUMMARY

The invention relates to a method for producing a leaf spring made of a fiber composite material, in which leaf spring, on at least one axial end, a bearing eye is configured. This method has, for the achievement of the defined object, the following method steps:

cutting prepreg strips of predetermined length from a prepreg strand, cutting out cutouts from the respective prepreg strip in the region of those axial ends on which respectively a bearing eye is intended to be configured, laying a plurality of prepreg strips alternately superficially flush one on top of the other in a prepreg stack to form a crude leaf spring, configuring the at least one bearing eye by deforming an axial end of the prepreg stack in a plane oriented perpendicularly to the longitudinal extent and perpendicularly to the transverse extent of the prepreg stack, setting the crude leaf spring to form the finished leaf spring in a mold, under the influence of a suitable setting pressure and a suitable setting temperature.

A thus produced leaf spring is produced from just a single material and has on at least one of its axial ends a bearing eye integrated into the leaf spring. Since no different material pairings are present in the leaf spring, during operation the static and dynamic forces transmitted via the at least one bearing eye into the leaf spring are readily absorbed and converted in the middle portion of the leaf spring into tensile and compressive stresses and, ultimately, into thermal energy.

The production of such a leaf spring should, above all, therefore be regarded as very cost-effective, because this is produced from individual prepreg strips which have a broadly similar circumferential geometry. The construction of a crude leaf spring from a stack of such prepreg strips can be automated, and also the production of the at least one bearing eye on the axial end of a crude leaf can be realized mechanically.

According to a first refinement of the method according to the invention, it is provided that, in the region of an axial end in the middle of the transverse extent of each individual prepreg strip, fiber composite material is removed by a first cutout. In the prepreg strip an opening is formed, which opening is required for the further shaping of the crude leaf spring or for the creation of the bearing eye.

Preferably, it is additionally provided that, for the construction of the crude leaf spring, prepreg strips of a first prepreg strip variety and prepreg strips of a second prepreg strip variety are required. These prepreg strip varieties are created by the fact that, at their axial end, fiber composite material is removed by a second cutout such that a narrow end portion is respectively configured there, wherein these end portions have a smaller transverse extent, i.e. width, in comparison to a middle portion of the prepreg strips.

The two different varieties of prepreg strips differ by the fact that, for the production of prepreg strips of the first prepreg strip variety, the diminution of the transverse extent or width at the axial end is realized on the left side. Accordingly, if the prepreg strip is viewed from above in the direction of its longitudinal extent, at its axial end on the left material is cut off, for instance in the shape of a rectangle. Hence on the right side of the axial end of the prepreg strip is left a narrow end portion having a length which is at least as long as the height of the crude leaf spring to be constructed.

For the production of prepreg strips of the second prepreg strip variety, the diminution of the transverse extent or width at the axial end is performed on the right side. Therefore, if the prepreg strip is viewed from above in the direction of its longitudinal extent, at its axial end on the right material is cut off, for instance in the shape of a rectangle. On the left side of the axial end of the prepreg strip is hence left a narrow end portion having a length which is likewise at least as long as the height of the crude leaf spring to be constructed.

The prepreg strips of the two prepreg strip varieties can be identical or different with respect to their materials, i.e. with respect to the fiber material and the synthetic resin. It is thus possible, for instance, to construct the prepreg strips of the first prepreg strip variety from glass fibers and the prepreg strips of the second prepreg strip variety from carbon fibers or aramid fibers, or vice versa.

According to a further embodiment of the method according to the invention, it is provided that the opening formed by the first cutout in the region of the middle of the transverse extent of the prepreg strips is filled with fiber composite material by a width-related compression of the directly adjacent longitudinally directed margins of the stack of the prepreg strips, and that, as a result of this compression, an indentation or constriction is molded onto the prepreg stack respectively on the right side and on the left side.

According to a further step, in this method variant it is provided that the axial end of the prepreg stack, i.e. the right-side and left-side narrow end portions of the individual prepreg strips, which end portions are laid one on top of the other, are bent in the shape of a circle in the direction of the axial middle of the crude leaf spring and are hereupon guided preferably fully through the right-side or left-side indentation or constriction of the prepreg stack. In order in this context to prevent possible material surplus in the region of the indentation or constriction, the right-side and left-side narrow end portions respectively have maximally the same cross-sectional area as the indentation or constriction into which these are guided.

Preferably, the right-side and left-side narrow end portions are guided as a stack fully through the associated indentation or constriction. The protrusion thereof on the bottom side of the leaf spring, following setting into the finished leaf spring, can be cut off from the latter or remain there. Insofar as it remains there, it is preferably compressed or diverted, so that it creates mechanical resistance to withdrawal from the region of the indentation or constriction. The force absorption capability of the bearing eye is hereby further enhanced.

According to a second method variant, it is provided that only prepreg strips of a third prepreg strip variety are used. For the production of prepreg strips of this third prepreg strip variety, a middle opening is created on the untrimmed prepreg strips in the region of their axial end, as described above, initially by a first cutout. Other than in the prepreg strips of the first and second variety, then, in relation to the top side of the axial end of the prepreg strip, both its right side and its left side are trimmed. At the axial end of the prepreg strip of the third variety there is hence left a centrally disposed narrow end portion, which is preferably at least just as long as the future height of the crude leaf spring to be constructed.

The thus produced prepreg strips of the third variety are then laid one on top of the other, forming a prepreg stack. Next the axial end of the prepreg stack is bent in the shape of a circle to form the bearing eye and the narrow end portions are stuck preferably fully through the opening created with the first cutout. Compression of the crude leaf spring for the closure of the middle opening, formed by the first cutout, in the respective prepreg strips hence does not take place in this method variant.

For the simpler creation of the respective bearing eye, according to one refinement of the invention it can be provided that the axial end of the prepreg stack, when bent in the direction of its axial middle, is laid over a molded body, the outer diameter of which corresponds to the subsequent inner diameter of the bearing eye. This molded body can be constituted by a hard foam core or by a metallic bearing sleeve, which are molded jointly in place during setting of the crude leaf spring into the finished leaf spring.

According to a further method variant, it is provided that the first cutout opening created in the respective prepreg strips is distanced differently far away from the axial end of the respective prepreg strips, and that, in the bottommost prepreg strip in the prepreg stack, which subsequently forms the outer side of the bearing eye, the first cutout opening has the greatest distance from the axial end of the prepreg strip, and that the cutout opening in the topmost prepreg strip of the prepreg stack, which subsequently forms the inner side of the bearing eye, has the least distance from the axial end of the prepreg strip.

For the creation of the first cutout opening in the prepreg strips, it is provided that this is cut out or punched out of the respective prepreg strip in an oval, rectangular or diamond shape.

Finally, as has already been indicated in the introduction, it is provided that the laying of the prepreg strips of the first prepreg strip variety and of the prepreg strips of the second prepreg strip variety, or third prepreg strip variety, one on top of the other is realized in a mold which broadly has the end geometry of the finished leaf spring, and that the setting of the crude leaf spring constructed in the mold is realized under the influence of a suitable pressing force and a suitable temperature, wherein surplus synthetic resin exits the crude leaf spring at those locations where the narrow end portions of both prepreg strip varieties are guided through the lateral indentations of the crude leaf spring.

The removal of surplus synthetic resin is at these locations particularly advantageous, because on the bottom side of the finished leaf spring the fiber composite material guided through the lateral indentations of the crude leaf spring is cut off superficially flush with the leaf spring, or bent there or compressed into a lump, so that compacted material accumulations are thereby likewise able to be jointly removed or used.

For the achievement of the product-related object, the invention relates to a leaf spring, consisting of a fiber composite material, in which a bearing eye is configured on at least one axial end. This leaf spring is preferably produced according to at least one of the previously described method steps. In this context, it is particularly provided that the leaf spring, with its at least one bearing eye, is made up of individual prepreg strips placed one on top of the other in layers, wherein, for the formation of the at least one bearing eye, the prepreg strips placed one on top of the other in layers are bent with their axial end in the direction of the axial middle of the prepreg stack and are fixedly connected to the fiber composite material disposed farther toward the middle in the axial direction.

The axial end of the crude leaf spring is accordingly axially returned to an end-proximate region of the crude leaf spring and is there fixedly connected to the fiber composite material, so that the forces acting on the bearing eye can be readily transmitted into the leaf spring. The fiber composite material of the prepreg strips preferably consists of longitudinally directed fibers and a thermoset plastic. It is also possible, however, to use a thermoplastic. Similarly, the prepreg strips can contain a woven fabric.

According to another refinement of the leaf spring according to the invention, it is provided that the prepreg strips, prior to being placed one on top of the other in layers to form a prepreg stack, have close to their axial end, roughly in the middle of their transverse extent, an opening configured by a first cutout of fiber composite material. This opening can have a substantially oval, rectangular or diamond-shaped geometry. In the region of this opening, although the fibers are cut through, the leaf spring is designed such that the fibers guided laterally past this opening can readily absorb the operational loads of the leaf spring.

According to a further feature of the invention, it is provided that the leaf spring is made up of two prepreg strip varieties of geometrically different configuration at their axial end, wherein the prepreg strips of these two prepreg strip varieties are stacked alternately one upon the other. The individual prepreg strips here have at their axial end, for the formation of the respective bearing eye, a reduced transverse extent, i.e. a reduced width, in comparison to a region of the leaf spring lying remote from the bearing eye.

The prepreg strips of the two prepreg strip varieties can be identical or different with respect to their materials, i.e. with respect to the fiber material and the synthetic resin. It is thus possible, for instance, to construct the prepreg strips of the first prepreg strip variety from glass fibers and the prepreg strips of the second prepreg strip variety from carbon fibers or aramid fibers, or vice versa.

The reduced end width of the prepreg strips of a first prepreg strip variety is created by cutting away a second cutout on the left side, and the reduced end width of the prepreg strips of a second prepreg strip variety is created by cutting away a surplus second cutout on the right side, to be precise such as has already been described in connection with the production method.

According to another refinement of the leaf spring, it is provided that the opening formed in the region of the middle of the transverse extent of the prepreg strips by the first cutout is filled with fiber composite material by compression of the directly adjacent margins of the prepreg stack, so that in this region, on the right side and on the left side, the fibers are deformed inward in relation to the width of the prepreg strips.

In addition, a leaf spring according to the invention is characterized in that the end which has been shortened on the right side or the left side in its transverse extent or width, or the narrow end portions of the respective prepreg strips, are jointly bent in the shape of a circle in the direction of the axial middle of the prepreg strips and are guided preferably fully through the right-side or left-side indentations or constriction of the prepreg stack.

Moreover, in a leaf spring of this kind, it is preferably provided that the cross-sectional area of the narrow end portion of the respective prepreg strips is broadly identical with the cross-sectional area of the associated indentations or constrictions, formed on the margins, of the prepreg stack.

In addition, it is preferably provided that the subsequently closed-off middle cutout opening of the prepreg strips is configured differently far away from its axial end, and that, in the bottommost prepreg strip in the prepreg stack, which subsequently forms the outer side of the bearing eye, the middle cutout opening has the greatest distance from the axial end of the prepreg strip, and that the middle cutout opening, in the topmost prepreg strip of the prepreg stack, which subsequently forms the inner side of the bearing eye, has the least distance from the axial end of the prepreg strip. The prepreg strips disposed between the bottommost and topmost prepreg strips in a prepreg stack here respectively have a middle cutout opening, the distance of which from the axial end of the prepreg strips decreases with increasing proximity to the topmost prepreg strip.

In an inventive leaf spring produced according to another production variant, it is provided that this is produced from prepreg strips of a third prepreg strip variety stacked one upon the other, wherein this third prepreg strip variety has the previously described opening placed in the middle of the end side, wherein, on these prepreg strips, a middle narrow end portion is formed by cutting out of a fourth cutout and fifth cutout on the right side and on the left side of their axial end, and in which leaf spring the end portions of the prepreg stack are bent in the shape of a circle to form a bearing eye and are stuck preferably fully through the opening created with the first cutout.

Further forms, objects, features, aspects, benefits, advantages, and embodiments of the present invention will become apparent from a detailed description and drawings provided herewith.

BRIEF DESCRIPTION OF THE DRAWINGS

For a better understanding of the invention, a drawing is appended to the description, in which drawing.

DESCRIPTION OF THE SELECTED EMBODIMENTS

Figure 1:
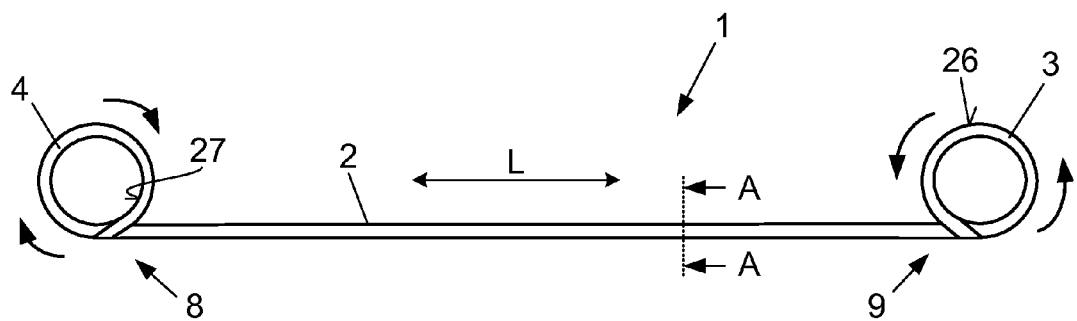
FIG. 1 shows a schematic side view of an inventively produced leaf spring made of a fiber composite material and having bearing eyes configured on the end of the leaf spring.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Accordingly, FIG. 1 shows in a schematic side view an inventively configured leaf spring 1, which is produced from a fiber composite material. This leaf spring 1 has a middle leaf spring portion 2, and two bearing eyes 3, 4, which are configured in the region of the axially outer ends 8, 9 of the leaf spring. These bearing eyes 3, 4 are produced such that their outer side 26 is formed by the material of the bottom side of the middle leaf spring portion 2 and their inner side 27 is formed by the material of the top side of the middle leaf spring portion 2. To this effect, the axial ends of the leaf spring 1, as indicated by the arrows, are turned axially inward in a circle shape and fixedly connected to the fiber composite material disposed farther toward the middle. This is also discussed in detail further below.

Figure 2:
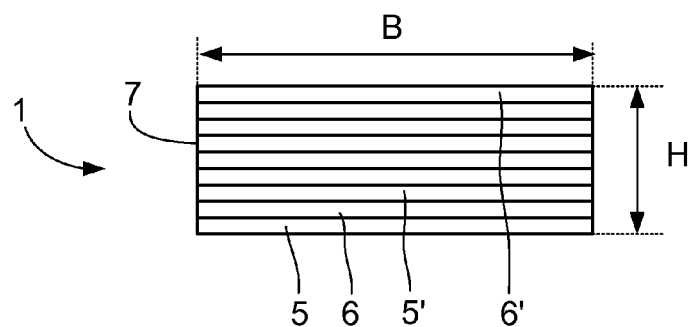
FIG. 2 shows a schematic cross-sectional view of the leaf spring according to FIG. 1 along a sectional line A-A.

As shown by the schematic cross section of FIG. 2 along the sectional line A-A according to FIG. 1, the leaf spring 1 consists of a plurality of prepreg strips 5, 6, 5', 6', which are deposited one on top of the other to form a prepreg stack 7. This prepreg stack 7 has a width B, a height H and a longitudinal extent L, and forms, after the creation of the bearing eyes 3, 4, a crude leaf spring 23, which in a pressing mold, with the application of a suitable setting pressure and suitable setting temperature, hardens into a finished leaf spring 1.

FIGS. 3A-3E show schematically in a first illustrative embodiment the most important steps of the production process for producing an inventive leaf spring 1.

First of all, prepreg strips 5, 6 having a predetermined length are cut off from a pre-produced prepreg strand of predefined width. These prepreg strips 5, 6 are next worked to form two geometrically somewhat different prepreg strip varieties, which then serve jointly for the construction of a prepreg stack 7 or for the construction of the crude leaf spring 23.

After the prepreg strips 5, 6 have been cut off from the prepreg strand, in a method step C1 (see FIG. 3A) a here oval opening 24 is created in the region of the axial end of each individual prepreg strip 5, at which a bearing eye 4 is intended to be configured, by a first, roughly middle cutout 10. At the same time, a narrow end portion 21 of width B1 and length L2 is created at the axial end 19' of the prepreg strip 5 by a second cutout 11.

Equally, in a further method step C2 (see FIG. 3B), a here oval opening 24 is created in the region of the axial end of each individual prepreg strip 6, at which a bearing eye is intended to be configured, by a first, roughly middle cutout 10. At the same time, a narrow end portion 22 of width B2 and length L2 is created at the axial end 19 of the prepreg strip 6 by a second cutout 11.

The cutouts 10 and 11, which have been cut out of the prepreg strip 5, 6, for instance, by a punching operation, are hereupon removed from the prepreg strip 5, 6. In this preferred illustrative embodiment, the width B1 of the narrow end portion 21 corresponds to the width B2 of the narrower end portion 22. Moreover, the narrow end portions 21, 22 of the prepreg strips 5 and 6 have the same axial length L2. The distance L1 of the oval opening 24 from the axial end 19, 19' of the two narrow end portions 21 and 22 is in this example respectively identical, even though different axial distances are of advantage. This is further discussed in connection with FIGS. 4A-4D. The differential path ΔL between the distance L1 of the opening 24 from the axial end 19, 19' of the prepreg strips 5, 6 and the axial length L2 of the narrow end portions 21, 22 is chosen such that this differential path ΔL corresponds to the respective circumference of the bearing eye 3, 4.

Figure 3A:
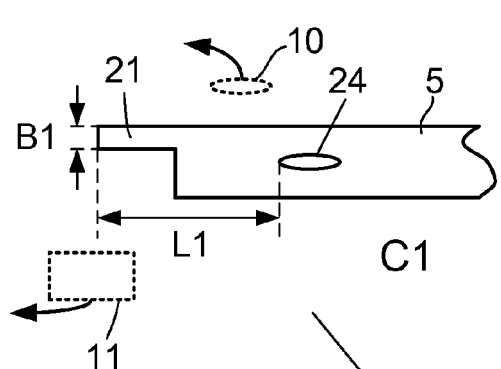
FIGS. 3A-3E show the production of an inventive leaf spring according to basic method steps.
Figure 3B:
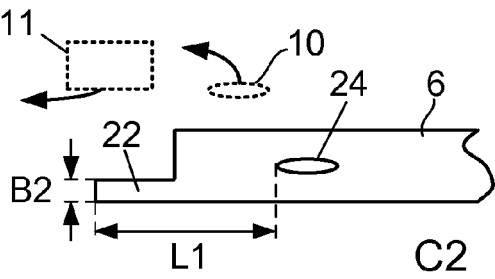
Figure 3C:
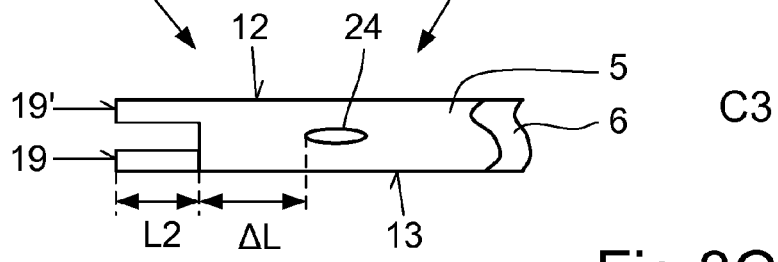
Figure 3D:
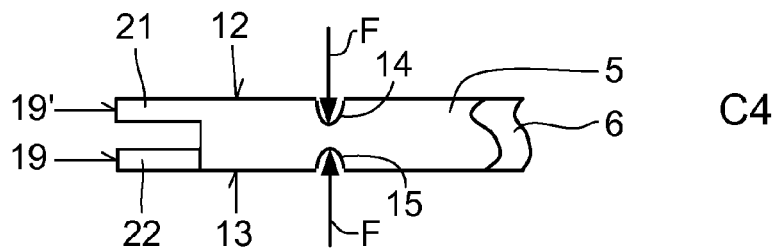
Figure 3E:
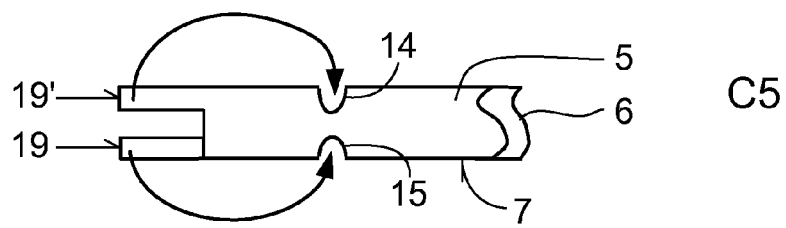
Figure 4D:
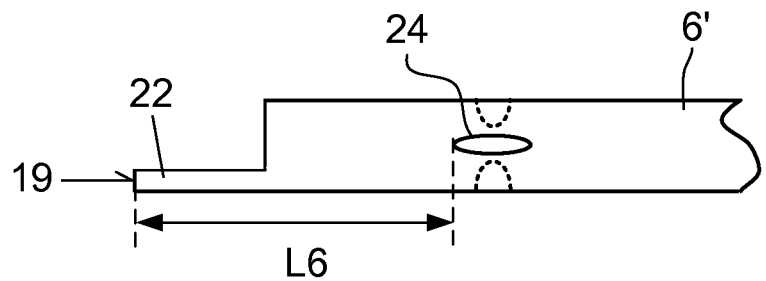
FIGS. 4A-4D show slightly differently configured prepreg strips of two prepreg varieties in a schematic top view.
Figure 4C:
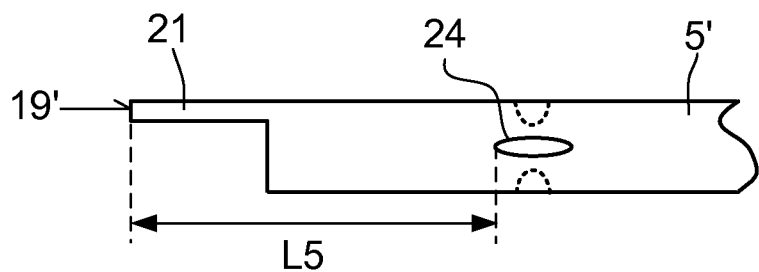
Figure 4B:
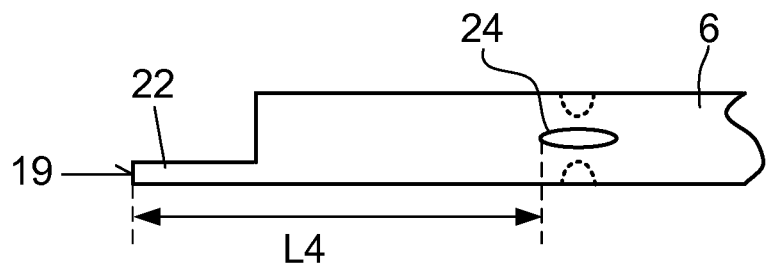
Figure 4A:
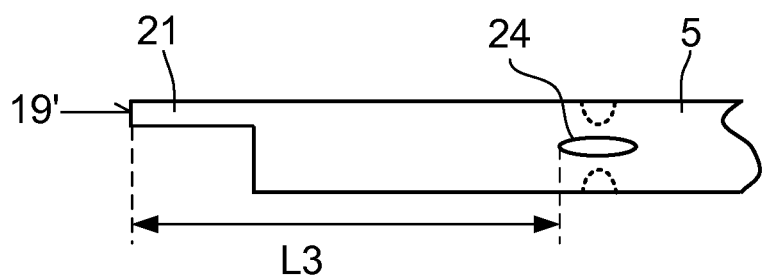

The prepreg strips 5, 6 trimmed in method steps C1 and C2 are then in a step C3 (see FIG. 3C) laid alternately superficially flush one on top of the other, wherein a plurality of these prepreg strips 5, 6, 5', 6' form the prepreg stack 7 for the creation of a crude leaf spring 23 (see also FIG. 2). As FIG. 3C illustrates in representation of the method step C3, the narrow end portions 21, 22 of the two varieties of prepreg strips 5, 6 are in this illustrative embodiment so narrow that between them, in the prepreg stack 7, is formed a region which is free from fiber composite material.

In a then following method step C4 (see FIG. 3D), the longitudinally directed margins 12 and 13 of the prepreg stack 7 and of the prepreg strips 5, 6, 5', 6', in the region of the oval opening 24, are compressed in the width B by means of a force F to the point where the thus displaced fiber composite material has closed off this opening 24. As a result of this deformation of the prepreg stack 7 or of the prepreg strips 5, 6, 5', 6', in the prepreg stack 7, in the region of the points of application for the force F, is respectively created an indentation or constriction 14, 15, which serve for the reception and, preferably, through-guidance, of the narrow end portions 21, 22.

In a further method step C5 (see FIG. 3E), a bearing eye 4 is created on the prepreg stack 7 by bending over of its axial end in a plane oriented perpendicularly to the longitudinal extent L and perpendicularly to the transverse extent B of the prepreg stack 7. The narrow end portions 21, 22 and portion ΔL of the prepreg stack 7 are here bent in the shape of a circle in the direction of its axial middle and the narrow end portions 21, 22 are guided through the indentations 14, 15.

Figure 7:
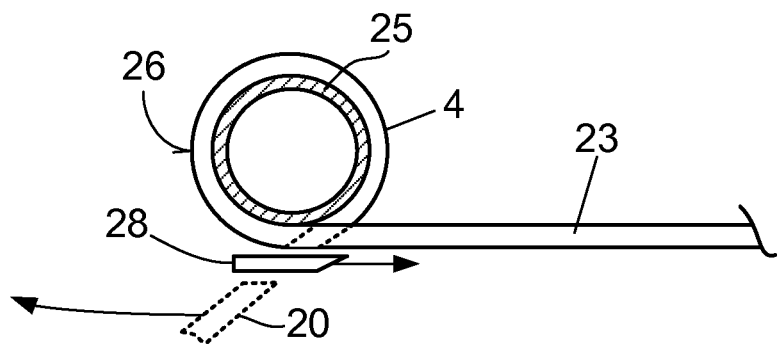
FIG. 7 shows a schematic side view of an inventive leaf spring in a, from the production engineering aspect, concluding cutting operation.

Since the prepreg stack 7, prior to its setting, is still a comparatively soft structure, the bending of the axial end of the prepreg stack 7 is preferably realized in a mold or via a molded body 25 which can subsequently be removed. The narrow end portions 21, 22 are preferably stuck fully through the associated indentations 14, 15, so that these initially extend a short way beneath the prepreg stack 7. Following the setting or hardening of the crude leaf spring 23 under a suitable setting pressure and suitable setting temperature, this protrusion is cut off by means of a cutting device 28, as is represented, by way of example, in FIG. 7. The protrusion can also, however, remain on the leaf spring, forming a thickening, as has already been explained.

In order to be able to use axially equally long prepreg strips 5, 6 of the two prepreg strip varieties for the production of the leaf spring 1, 23, it is of advantage to configure the opening 24, created by the first cutout 10, in the respective prepreg strips 5, 6, 5', 6' differently far away from the axial ends 19, 19' thereof. Allowance is hereby made for the fact that a bearing eye has a smaller circumference on its radial inner side than on its outer side.

Accordingly, it is provided according to FIGS. 4A-4D that the middle cutout opening 24 of each individual prepreg strip is differently far away from its axial end 19, 19', wherein in the bottommost prepreg strip 5 of the prepreg stack 7, which subsequently forms the outer side 26 of the bearing eye 3, 4, the middle cutout opening 24 has the greatest distance L3 from the axial end 19, 19' of the prepreg strip 5, and that the cutout opening 24, in the topmost prepreg strip 6' of the prepreg stack 7, which subsequently forms the inner side 27 of the bearing eye 3, 4, has the least distance L6 from the axial end 19 of the prepreg strip 6'.

This means that the prepreg strips 5, 6, 5', 6' of the prepreg stack 7, even after they have been turned up to form the bearing eye 4, despite different radial position and thus different circumferential length at the bearing eye 4 in the region of the indentations 14, 15, can be stuck through these with full length L2. This further means that that region ΔL in the prepreg stack 7 which is formed between the opening 24 and the start of the narrow end portions 21, 22 is sufficiently long to form the bearing eye 4 at a predetermined circumferential radius thereof.

In order further to illustrate the geometric relationships, FIGS. 4A-4D show in its illustrations, by way of example, four prepreg strips 5, 6, 5', 6', which are laid superficially flush one upon the other to form a prepreg stack 7. The bottommost layer of the prepreg stack 7 is formed by the prepreg strip 5 according to FIG. 4A. In the case of this prepreg strip 5, the distance L3 between the opening 24 and the axial end 19 of the same is greatest in comparison to the other prepreg strips 6, 5', 6', since it forms the outer circumference of the bearing eye 4. In the case of the prepreg strips 6, 5' and 6' which then follow in the prepreg stack 7, the distance L4, L5 and L6 between the opening 24 and the axial end 19, 19' of the same is respectively somewhat shorter, wherein the prepreg strip 6' forms with its surface the inner side 27 of the future bearing eye 4.

Figure 5:
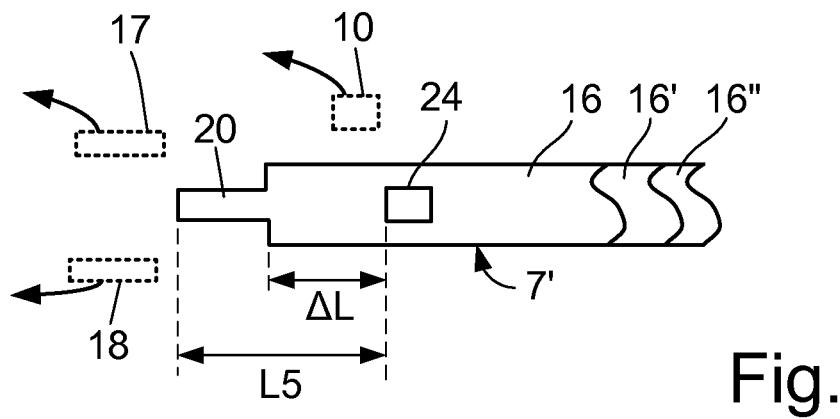
FIG. 5 shows a first method step for producing a second variant of an inventively constructed leaf spring.
Figure 6:
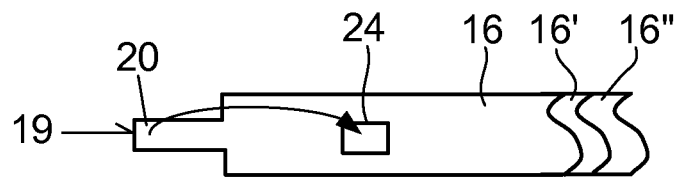
FIG. 6 shows a second method step for producing a second variant of an inventively constructed leaf spring.

FIGS. 5 and 6 show that a fiber composite leaf spring to be produced according to the invention can also be constructed somewhat differently. Thus, to this effect, prepreg strips 16, 16', 16" which are geometrically identical with regard to their circumference are laid one on top of the other, forming a prepreg stack 7'. In the case of this prepreg strip 16, 16', 16", the narrow end portion 20 is formed centrally at the axial end of each individual prepreg strip 16, 16', 16" by punching out a third cutout 17 on the right side and a fourth cutout 18 on the left side. Moreover, these prepreg strips 16, 16', 16" likewise have a middle opening 24, which is here of rectangular configuration and has been created by punching out of the first cutout 10.

As illustrated by FIG. 6, in one production step the axial ends 19 of the narrow end portions 20 and the strip portions ΔL of the prepreg stack 7' are likewise bent in the shape of a circle in the direction of the axial middle of the prepreg stack 7' and the end portions 20 are guided preferably fully through the opening 24. A bearing eye 4, initially supported by a molded body 25, is hereby created, wherein the regions of the narrow end portions 20 and of the rim of the opening 24, after the hardening of the leaf spring, form a strong bond.

Also in the illustrative embodiment according to FIGS. 5 and 6, the opening 24 of each individual prepreg strip 16, 16', 16" is disposed differently far away from its axial end 19 in order to make allowance in the bearing eye 4 for the circumferential length, which is differently long in dependence on the position.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A leaf spring, consisting of a fiber composite material, in which a bearing eye is configured on at least one axial end, said leaf spring comprising:
   a plurality of prepreg strips constructed and arranged to be placed one on top of another in layers thereby forming a prepreg stack, wherein, for the formation of the bearing eye, said prepreg strips are bent with an axial end directed toward an axial middle of said prepreg stack and said prepreg strips being fixedly connected to a portion of the fiber composite material which is disposed toward a middle section of said leaf spring, in the axial direction.

2. The leaf spring of claim 1, wherein each prepreg strip of said plurality defines a cutout opening configured by a first cutout of fiber composite material, said cutout opening being positioned adjacent the axial end.

3. The leaf spring of claim 2, wherein said cutout opening is filled with fiber composite material wherein in this region, on the right side and on the left side, fibers of the prepreg strips are deformed inward forming indentations.

4. The leaf spring of claim 3, wherein the narrow end portions of the respective prepreg strips are jointly bent in the shape of a circle in the direction of the axial middle of the prepreg strips and are guided through the right-side or left-side indentations of the prepreg stack.

5. The leaf spring of claim 4, wherein the cross-sectional area of the narrow end portion of the respective prepreg strips is substantially the same with the cross-sectional area of the indentations.

6. The leaf spring of claim 5, wherein each prepreg strip of said plurality has its cutout opening located at a dimension from its axial end wherein said distance is different for each prepreg strip.

7. The leaf spring of claim 6, wherein the prepreg strips disposed between the bottommost and topmost prepreg strip in a prepreg stack respectively have a middle cutout opening, the distance of which from the axial end of the prepreg strips decreases with increasing proximity to the topmost prepreg strip.

8. The leaf spring of claim 7, which is produced from prepreg strips of a third prepreg strip variety stacked one upon the other, wherein, on these prepreg strips, a middle narrow end portion is formed by cutting out of a fourth cutout and fifth cutout on the right side and on the left side of an axial end, and in that these end portions of the prepreg stack are bent into a circle for the formation of the bearing eye and are stuck through the cutout opening created with the first cutout.

9. The leaf spring of claim 6 wherein said prepreg stack includes an uppermost prepreg strip and a lowermost prepreg strip and wherein the lowermost prepreg strip has the greatest cutout opening distance of all other prepreg strips of said plurality and the uppermost prepreg strip has the least cutout opening distance of all other prepreg strips of said plurality.

10. The leaf spring of claim 2, wherein the cutout opening in each prepreg strip of said plurality has a substantially oval, rectangular or diamond-shaped geometry.

11. The leaf spring of claim 1, wherein the leaf spring is made up of two prepreg strip varieties of geometrically different configuration at their axial end, wherein the prepreg strips of these two prepreg strip varieties are stacked alternately one upon the other.

12. The leaf spring of claim 11, wherein each prepreg strip of said plurality has at said axial end, for the formation of the bearing eye, a reduced transverse extent in comparison to a region of the leaf spring lying remote from the bearing eye.

13. The leaf spring of claim 12, wherein the prepreg strips of a first prepreg strip variety are shortened in their transverse extent at their axial end.

14. The leaf spring of claim 12, wherein the prepreg strips of a second prepreg strip variety are shortened in their transverse extent (B2) at their axial end.

15. The leaf spring of claim 1, wherein the fiber composite material of the prepreg strips consists of longitudinally directed fibers and a thermoset plastic or a thermoplastic.

* * * * *